Sept. 8, 1964
J. J. PEARL
3,147,782
VENEER END SCARFING MACHINE
Filed Aug. 17, 1960
4 Sheets-Sheet 1
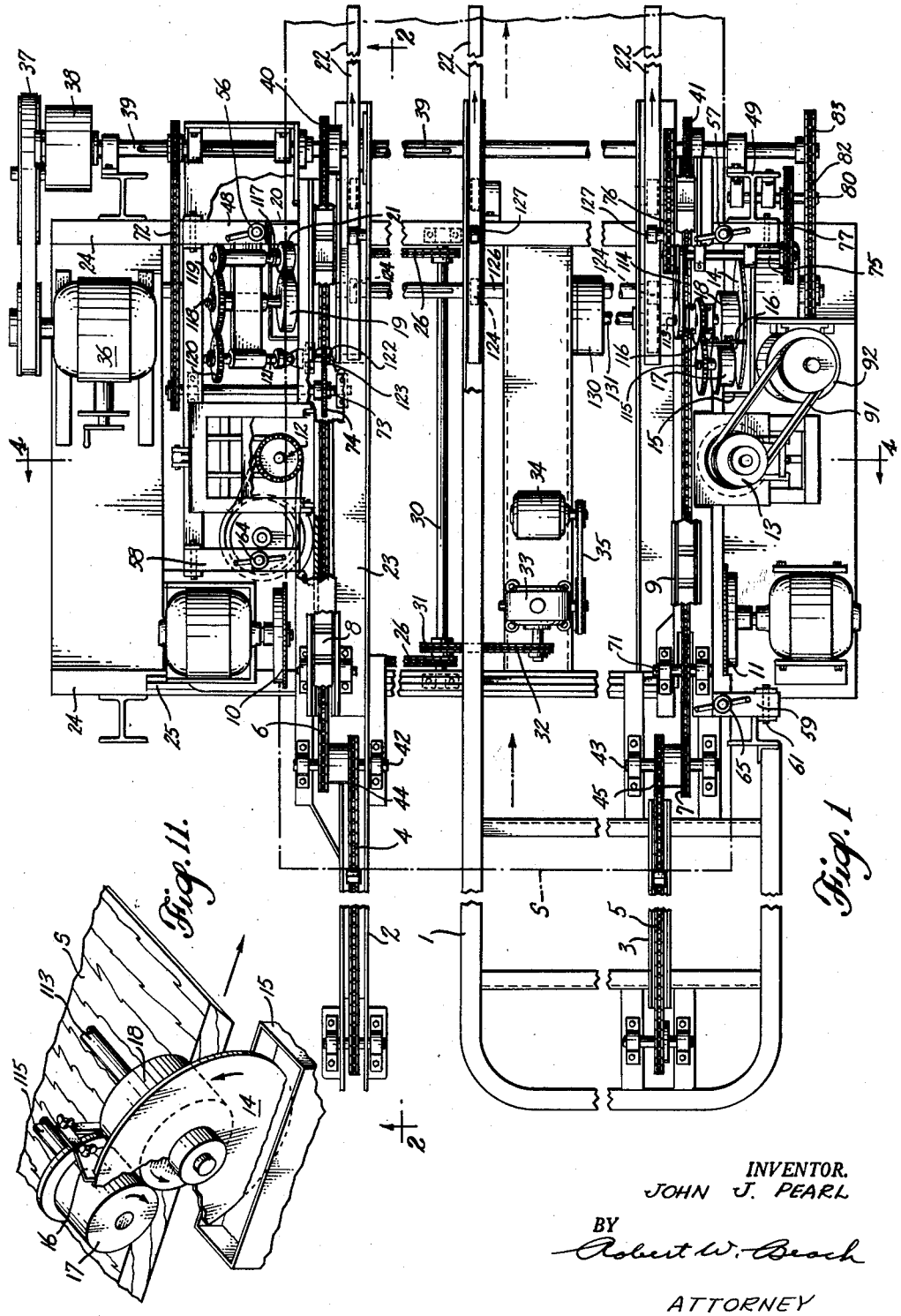
INVENTOR.
JOHN J. PEARL
BY
Robert W. Beach
ATTORNEY Sept. 8, 1964  J. J. PEARL  3,147,782
VENEER END SCARFING MACHINE
Filed Aug. 17, 1960  4 Sheets-Sheet 2
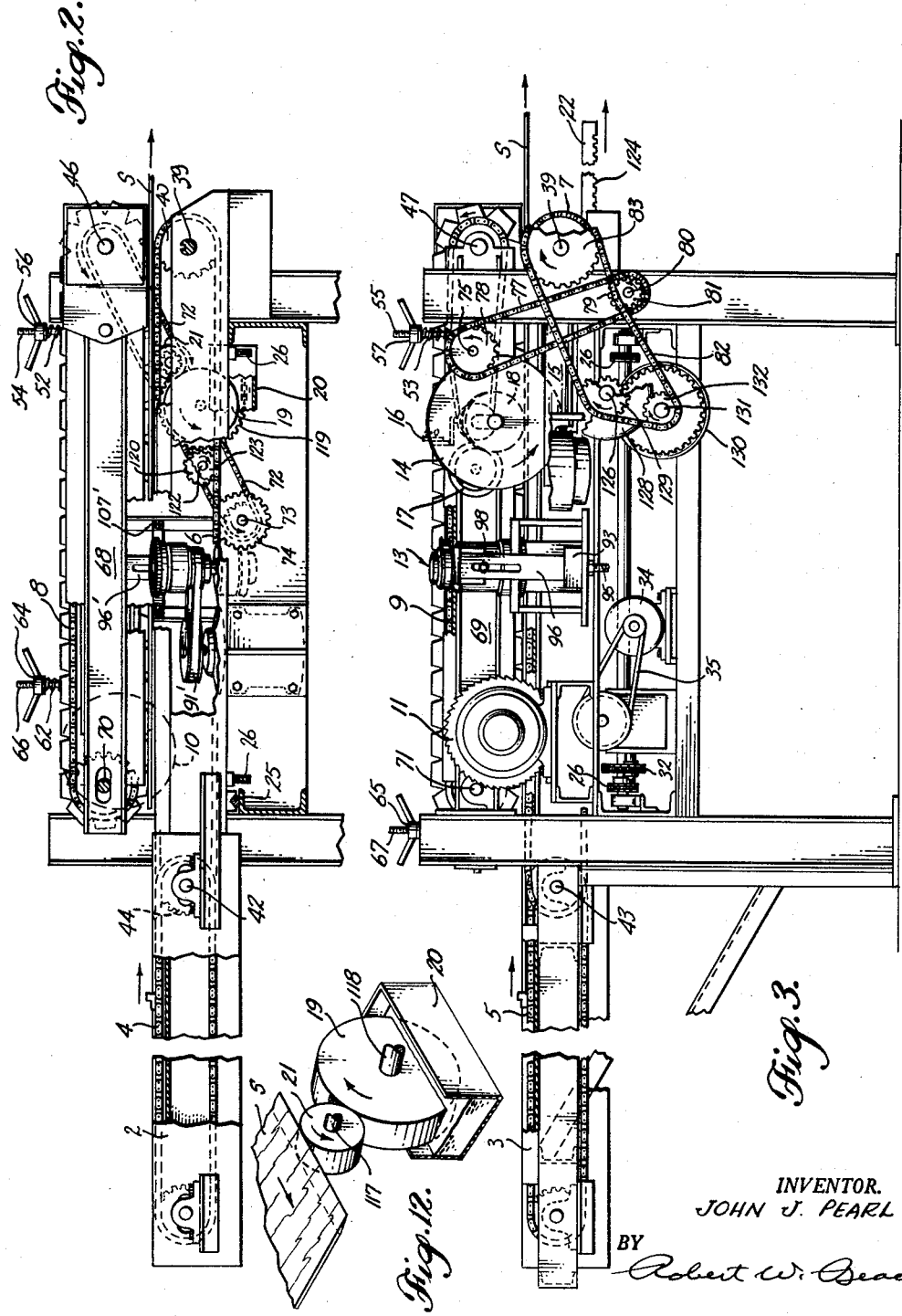
INVENTOR.
JOHN J. PEARL
BY
Robert W. Beach
ATTORNEY

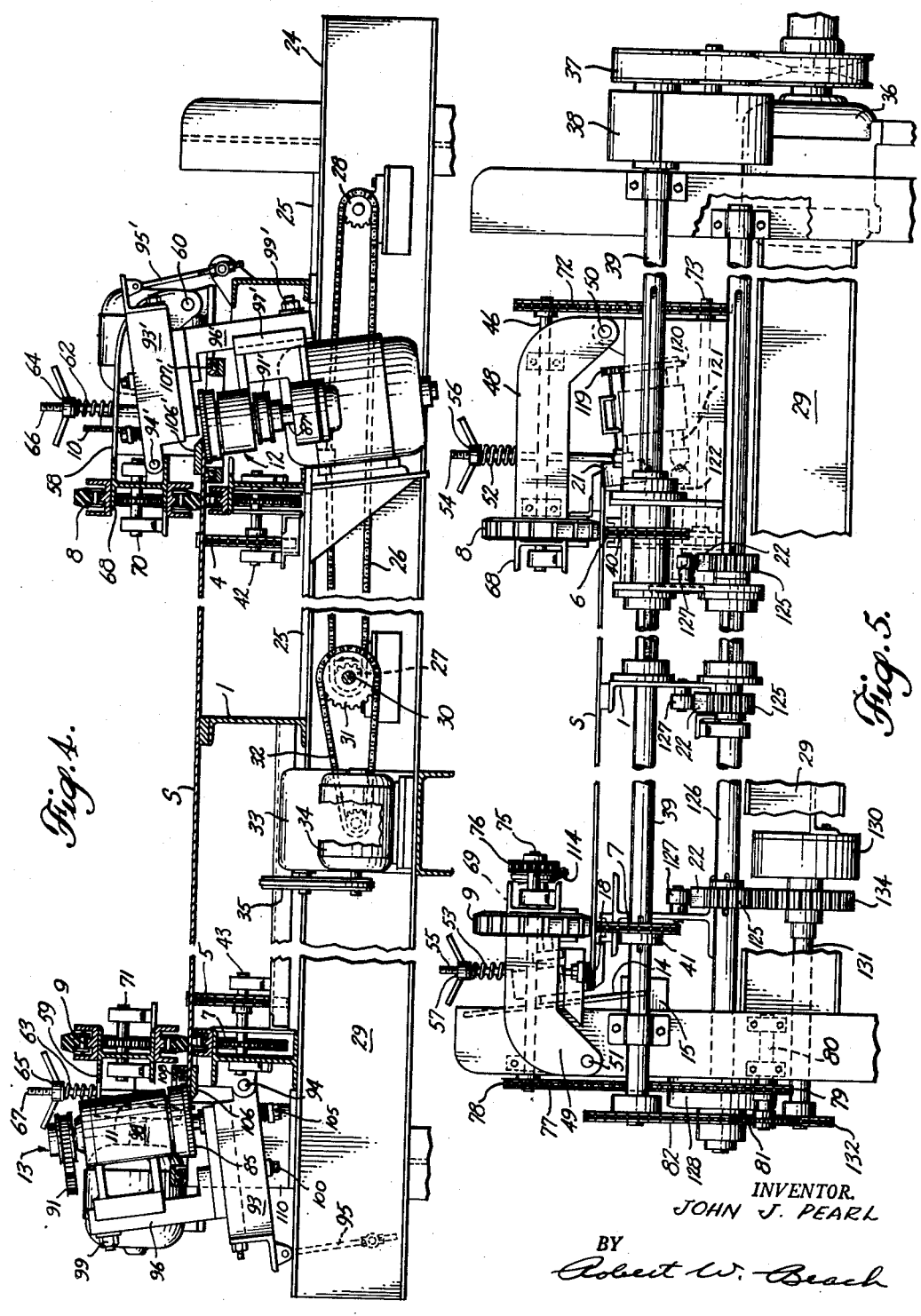

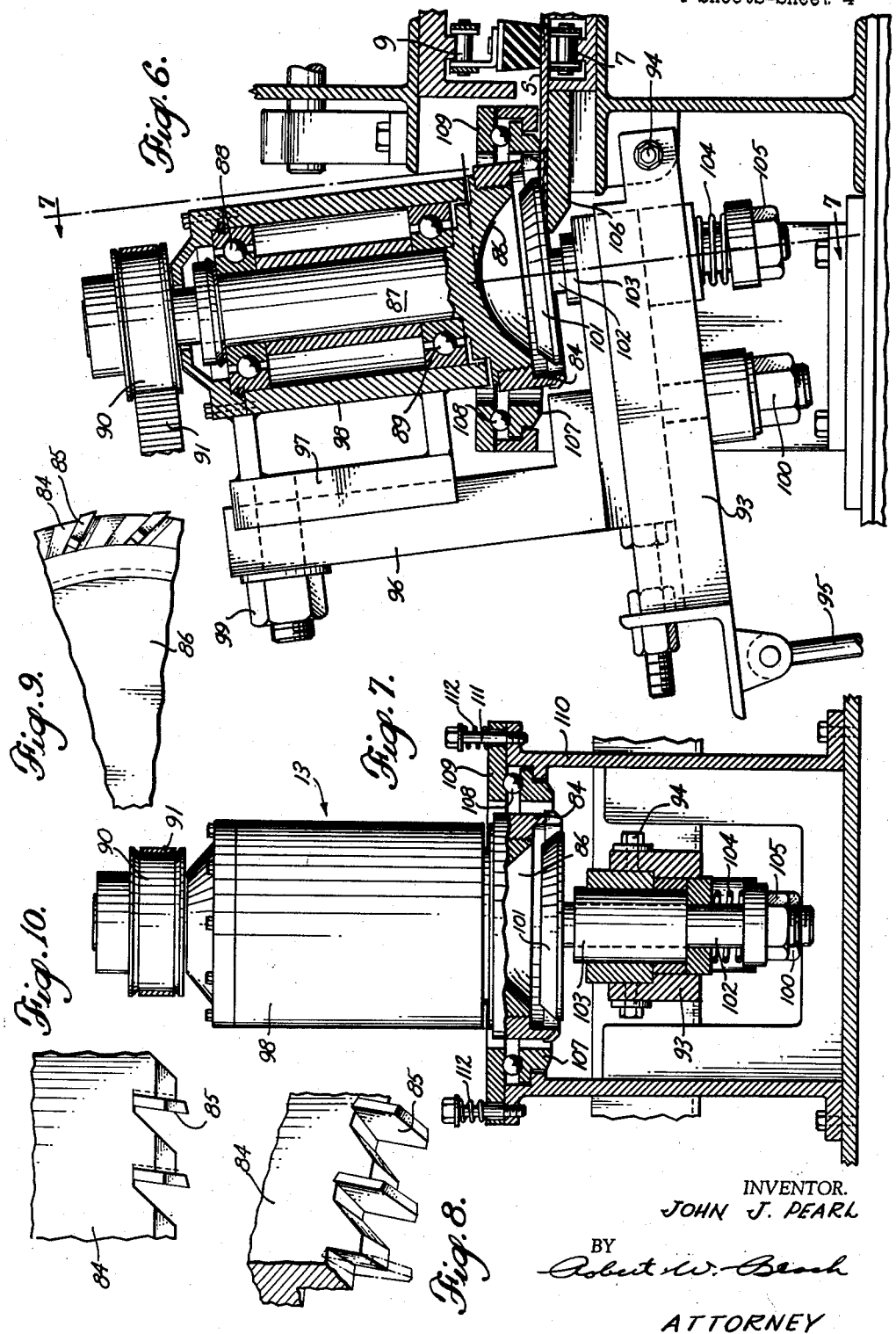

United States Patent Office 3,147,782
Patented Sept. 8, 1964

3,147,782
VENEER END SCARFING MACHINE
John J. Pearl, Lebanon, Oreg., assignor, by mesne assignments, to United States Plywood Corporation, New York, N.Y., a corporation of New York
Filed Aug. 17, 1960, Ser. No. 50,120
2 Claims. (Cl. 144—124)

This invention relates to a machine for scarfing opposite ends of a veneer sheet preparatory to joining sheets together by bonding of such scarfed ends.

In such a veneer end scarfing machine it is a principal object to provide mechanism for producing an accurate, smooth, uniform scarf on the end of a veneer sheet even though such veneer may be warped when it is in relaxed condition.

A further object is to provide such a machine which will cut scarfs simultaneously on two opposite ends of a veneer sheet and which sheet at the same time can be trimmed to a desired length so that such scarfed ends will be parallel and spaced apart a predetermined distance. In thus scarfing the opposite ends of a veneer sheet, the scarfing machine can be adjusted to accommodate veneer sheets of different selected lengths.

Since the purpose of scarfing an end of a veneer sheet is to enable such end to be joined to a scarfed end of another veneer sheet, such scarfed end must be straight and, preferably, has glue applied to it. Consequently, it is an object in a single operation to trim the ends of a veneer sheet so that it is straight, to cut such ends on a bevel so as to form a scarf and to apply adhesive to the scarfed surface which can be used for joining together such scarfed surfaces. Where two opposite ends of a veneer sheet are scarfed simultaneously it is an object to form the scarf on one end of the sheet as a standing bevel and to form that on the opposite end of the veneer sheet as an under bevel.

A further object is to provide mechanism in such a scarfing machine which will hold the end portion of a veneer sheet flat while it is being scarfed, so that when such end portion is flattened again the scarfed surface again will be flattened to enable an accurate joint to be made.

An incidental object is to provide a scarfing cutter which will produce an accurate and smooth cut on the end of a veneer sheet and which will be adapted to make such an end scarf cut on veneer sheets of various thicknesses.

In connection with such a scarfing machine it is an object to provide automatic off-bearing piling mechanism for stacking the veneer sheets successively after their ends have been scarfed.

These objects can be accomplished by a veneer end scarfing machine which will transport veneer sheets endwise through the machine in flat condition and will trim the veneer sheet to length, scarf cut its opposite ends, one with a standing bevel and the other with an under bevel, and apply glue to such scarfed ends during movement of each veneer sheet through the machine. The trimming and scarfing mechanism for one end of the veneer sheet can be mounted stationarily and the trimming and scarfing mechanism for cutting the opposite end of a veneer sheet can be mounted for movement toward and away from the first trimming and scarfing mechanism to accommodate veneer sheets of different length. Off-bearing mechanism can include a plurality of reciprocable arms retractable from beneath veneer sheets, the ends of which have been scarfed, so that they can float downward onto the top of a stack of sheets being accumulated.

FIGURE 1 is a plan view of the veneer scarfing machine.
FIGURE 2 is a sectional view through the veneer scarfing machine taken on line 2—2 of FIGURE 1.
FIGURE 3 is a side elevation of the scarfing machine.
FIGURE 4 is a section through the machine on line 4—4 of FIGURE 1.
FIGURE 5 is a discharge end elevation of the machine.
FIGURE 6 is an enlarged side elevation of a scarfing head with parts broken away and FIGURE 7 is a view of such scarfing head taken along line 7—7 of FIGURE 6. FIGURE 8 is a fragmentary perspective view, FIGURE 9 is a fragmentary face view and FIGURE 10 is a fragmentary elevation view of a peripheral portion of the cutter head's cutting end showing the scarfing cutter teeth.
FIGURE 11 (Sheet 1) is a top perspective view of the upper glue-applying mechanism with parts broken away, and FIGURE 12 (Sheet 2) is a bottom perspective view of the lower glue-applying mechanism.

Logs suitable for making veneer for use in the manufacture of plywood are cut into blocks of a standard length, for example 100 inches, to fit into a veneer lathe for peeling into rotary cut veneer. Each block is peeled into a sheet containing several grades of veneer. The block length standard is selected so that the resulting veneer sheet can be cut into sheet sections each of a length suitable for making plywood sheets of the desired length from the higher grade portion of the log. Because of knots and other defects, a portion of the log produces lower grade veneer. Such lower grade veneers are used for inner plies and backs or faces of lower grade sheets. Salable lengths of lower grade panels are often longer or shorter than salable lengths of high grade panels. By end-joining the low grade veneer sheets into a continuous sheet and recutting such continuous sheet into sections of a desirable length, the veneer can be used in the manufacture of plywood of salable lengths. Such end-joining of veneer presents a problem because the veneer sheets will be of different lengths and veneer, particularly if rotary cut, tends to warp when it is dried. In end-joining veneer pieces it is also desirable to minimize the labor involved and to expedite the process to effect maximum economy in manufacture of the plywood.

Use of the machine of this invention insures that even though the end of a veneer sheet may be warped in relaxed condition it will be pressed flat when being prepared for making a joint by being scarfed. When veneer sheet ends scarfed by the present machine are brought together to form a joint, therefore, and again flattened, they will match accurately and their scarfs can be bonded contiguously. Moreover, the machine will expedite preparation of a veneer sheet because opposite sheet ends can be trimmed to parallelism and scarfed in a single pass through the machine. To enable such operation to be accomplished, it is necessary to incorporate in the machine two sets of trimming and scarfing devices, one for each end of the sheets. The spacing between such devices must be made adjustable to enable the machine to accommodate veneer sheets of different lengths.

In the machine illustrated in the drawings, sheets of veneer are transported edgewise. A sheet of veneer can be supported for such movement on frame members 1, 2 and 3, shown in FIGURE 1. The frame members 2 and 3 are channels with their flanges projecting upward to form spaced ridges between which are received transport chains 4 and 5 having lugs at intervals to engage the trailing edge of a veneer sheet to be transported through the machine. The central portion of the veneer sheet may slide on the member 1. Since the lugs are the only part of chains 4 and 5 projecting above the projecting flanges, they are the only means of transporting the sheets. Thus, if the lugs are synchronized, the trailing sheet edge will be pushed squarely into the machine.

At the discharge ends of chains 4 and 5 additional transport chains 6 and 7, respectively, extend through the remainder of the machine which cooperate with endless presser chains or endless tread members 8 and 9 respectively overlying the chains 6 and 7. The presser members 8 and 9 are driven at the same speed as chains 6 and 7 and serve both to clamp the opposite veneer sheet ends to such chains for transporting the sheet through the machine and to press the opposite end portions of the veneer sheet flat against chains 6 and 7 so as to remove warpage which may be present in the end portions of the veneer sheet when in relaxed condition. Chains 6, 7, 8 and 9 travel at a speed greater than chains 4 and 5 to draw the veneer sheets away from the lugs on these chains before the lugs pass over the sprockets at the ends of chains 4 and 5. Such accelerated movement of the veneer prevents damage to the trailing edges of the veneer sheets by the lugs as they are tilted forward by the chains wrapping around the sprockets.

The transport chains 6 and 7 extend past veneer end trimming and scarfing stations. Trim saws 10 and 11 driven by independent electric motors are mounted adjacent to the chains 6 and 7, respectively, and will be encountered by the ends of a veneer sheet S being moved in the direction indicated by the arrow in FIGURE 1 before such ends are operated upon by scarfing devices 12 and 13 located beyond the trim saws 10 and 11 in the direction of veneer sheet movement. Before the veneer sheet ends are scarfed, therefore, they will be cut by the trim saws 10 and 11 while the end portions of such sheet are held so as to insure that the opposite ends of the veneer sheet will be cut straight and parallel. When they are scarfed by the scarfing devices 12 and 13, therefore, the scarfed surface will be planar.

To avoid the necessity of flopping any of the veneer sheets side-for-side by a subsequent handling operation prior to joining the scarfed ends of veneer sheets, it is preferred that one of the scarfing devices cut a standing bevel and the other scarfing device cut an under bevel. As seen in FIGURE 1 the scarfing cutter 13 is arranged to cut a standing bevel on one veneer sheet end while the scarfing device 12 is inverted to cut an under bevel on the other sheet end. This relationship of the scarfing devices is more apparent from the illustration of FIGURE 4.

Scarfed ends of veneer sheets preferably are joined adhesively and usually by a thermosetting type of adhesive. It is convenient to apply such adhesive to the scarfed ends of a veneer sheet during its passage through the machine of the present invention immediately after scarfing of the ends has been performed and before they are released from the chains 6, 8 and 7, 9, respectively. The adhesive thus applied will dry in place quite quickly and later can be polymerized and bonded by the application of heat when scarfed ends to which adhesive has been applied are placed in overlapping relationship and pressed together.

The adhesive-applying devices of the present machine are shown best in FIGURES 1, 2, 3, 11 and 12. The mechanism for applying adhesive to the standing bevel shown in detail in FIGURE 11 includes an adhesive pickup disk 14, the peripheral portion of which runs in a trough 15 of adhesive. From this disk a scraper blade 16 scrapes adhesive which falls into the angle between the adjacent peripheries of a doctor roll 17 and an adhesive applicator roll 18. These rolls cooperate to enable the applicator roll 18 to roll an adhesive film of the desired thickness onto the scarfed edge of the sheet S.

In FIGURE 12 mechanism for applying glue to the under bevel is shown in detail. This mechanism includes a relatively large glue pick-up and applying wheel 19, the lower peripheral portion of which runs in a glue trough 20. A doctor roll 21 driven to rotate in the direction opposite the roll 19 and of much smaller diameter is mounted closely adjacent to the roll 19 so as to squeeze off the periphery of the roll 19 adhesive in excess of the desired film thickness. The roll 19 rolls onto the under bevel of the veneer end this remaining film so as to apply a coating of adhesive of uniform and predetermined thickness.

From the transport chains 6 and 7 the scarfed veneer sheet will be discharged onto a plurality of lengthwise reciprocating bars 22. These bars are projected lengthwise in the direction indicated by the arrows in FIGURE 1 at a speed equal to the linear speed of travel of the chains 6 and 7 and the chains 8 and 9. When the trailing edge of a veneer sheet has passed beyond the chains 6 and 7 it will be supported entirely by the bars 22. The drive mechanism for these bars can then be reversed so that they will be driven at a relatively high speed lengthwise to the left as seen in FIGURE 1. The upper sides of these bars are smooth and the speed of their movement will be sufficiently rapid to withdraw them from beneath the veneer sheet, the inertia of which will render the veneer sheet unable to follow the bars 22 in their retracting movement. Hold-back means may be provide to engage the veneer sheet for positively preventing its backward movement with the bars. As the veneer sheet is deprived of the supporting action of the bars 22 by their withdrawal in this fashion, such sheet will drop and following veneer sheets will be dropped successively in like fashion so that the scarfed veneer sheets will be accumulated automatically in a stack at the discharge side of the scarfing machine.

If the scarfing machine described were always to operate upon veneer sheets of the same length the framework supporting the transport, trimming, scarfing and adhesive-applying mechanism described could all be mounted in positions having a single definite relative relationship. The principal use of the machine, however, is to scarf veneer sheets of different lengths and consequently the components of the machine for engaging and processing the opposite ends of a veneer sheet are arranged to be shifted relatively to alter their spacing transversely of the direction of movement of the transport chains. While each set of veneer end-engaging and processing units could be shiftably mounted, if desired, the alteration in spacing of such devices can be accomplished satisfactorily by mounting only one set of end-engaging and processing units to be shifted.

In the machine illustrated in the drawings, the veneer end-engaging chains 5, 7 and 9, the trim saw unit 11, the scarfing device 13 and the adhesive-applying mechanism 14, 15, 16, 17 and 18 are mounted on the machine frame in predetermined positions so as not to be shiftable. On the contrary, the transport chains 4, 6 and 8, the trim saw 10, the scarfing device 12 and the adhesive-applying mechanism 19, 20 and 21 are mounted on a carriage 23 slidable along ways 24 for adjustment within wide limits toward and away from the transport chains 5 and 7 in a direction transversely of their direction of movement. By thus shifting the carriage 23 the transport chains will engage end portions of veneer sheets of different lengths within reasonably wide limits so as to avoid unnecessary waste of veneer.

All of the transport chains 4, 6 and 8 and all of the veneer end processing units, including the trimming device 10, the scarfer 12 and the adhesive-applying device 19, 20 and 21 are mounted on the carriage 23 so that these various devices are shifted as a unit. Such shifting of the carriage will, therefore, not alter the relationship of the end-trimming device, the scarfer and the adhesive applying device to the veneer end gripping chains 6 and 8. It is necessary, of course, to provide drive mechanism for these various components which will be operative in different shifted positions of the carriage 23. The transport chains and the arms 22 can and should be driven by the same motor that drives the transport chains 5, 7 and 9 at the opposite side of the machine.

To insure that the transport chains 4, 6 and 8 remain precisely parallel to the transport chains 5, 7 and 9 as the spacing between the opposite sets of transport chains is varied, guide mechanism is provided in the form of a track 25 extending along one of the ways 24. This track is engaged by rollers or shoes on the bottom of carriage 23 over a considerable effective length so as to prevent swerving of the carriage as it is moved along the ways. Such a track is provided on only one of the ways so as to avoid any binding between the track and track-engaging members under changing temperature conditions even though the track-engaging members fit the track quite closely.

Drive mechanism for sliding the carriage 23 along the ways to vary the spacing between the opposite end processing units includes chains 26 located respectively alongside the ways 24 which are shown best in FIGURES 1 and 4. These chains engage sprockets 27 and 28 rotatively mounted in spaced relationship on parallel beams 29 supporting the ways 24 or the upper surfaces of which constitute such ways. The sprockets 27 are interconnected by a shaft 30 which serves the dual purpose of driving both sprockets and insuring that the chains 26 will be moved in precise synchronism. A lug or fitting of each of these chains is suitably connected to a portion of carriage 23 adjacent to one of the ways 24 so that a driving force will be applied to each end of the carriage. The common shaft 30 is turned by a sprocket 31 driven by a chain 32 from a suitable speed reducer 33. This speed reducer in turn is driven by an electric motor 34 through a belt 35.

The two sets of transport chains 4, 6 and 8 on the carriage 23 and 5, 7 and 9 mounted on the stationary framework of the machine are driven by an electric motor 36 which is common to them. This electric motor drives a belt 37 connected through a speed reducer 38 to an upper shaft 39. This shaft carries sprockets 40 and 41 which are engaged respectively by chains 6 and 7 which are thus driven by the sprockets. As shown in FIGURES 1, 2 and 3, the sprockets at the opposite ends of these transport chains are carried by stub shafts 42 and 43, respectively, on which sprockets 44 and 45 for chains 4 and 5 are mounted. The size of sprockets 44 and 45 is selected so that these latter chains are driven slightly slower than chains 6 and 7, as mentioned previously.

The upper chains 8 and 9 are driven by sprockets mounted on shafts 46 and 47, respectively, shown in FIGURES 2, 3 and 5. These shafts extend through or alongside arms 48 and 49, respectively, which are swingably mounted on the machine by pivots 50 and 51, respectively. Such arms are urged downwardly by compression springs 52 and 53 encircling threaded rods 54 and 55. The springs react against large wing nuts 56 and 57 threaded on the rods 54 and 55 which can be screwed along the rods to vary the pressure of the springs against the arms and consequently of the pads on chains 8 and 9 against veneer sheets resting on chains 6 and 7.

Arms 58 and 59, similar to arms 48 and 49, are swingably mounted by pivots 60 and 61, respectively, as shown in FIGURES 1 and 4. Springs 62 and 63 are arranged to press arms 58 and 59 downwardly by reaction from large wing nuts 64 and 65 threaded on upright rods 66 and 67. The swinging ends of arms 48 and 58 and the swinging ends of arms 49 and 59 cooperatively support beams 68 and 69, respectively, shown best in FIGURES 2 to 5, within the loops of upper hold-down chains 8 and 9. These beams carry suitable backing structure for the chains so that pressure will be applied to the veneer end portions throughout the entire extent of the lower stretches of such chains in a positive manner. The end portions of the loops of chains 8 and 9 remote from the driving shafts are carried by sprockets turning on shafts 70 and 71, respectively, which are mounted on flanges of the beams 68 and 69 and extend through slots in the webs of such beams so that their bearings can be adjusted along the beams to establish the desired tightness of the chains. By adjustment of wing nuts 64 and 65 the pressure of the chains 8 and 9 at their feed ends on the veneer can be adjusted.

It is, of course, necessary for the upper chains 8 and 9 to be driven at the same speed as the lower chains 6 and 7. The upper chain drive shafts 46 and 47 are therefore driven by drive mechanism actuated by the lower chains. Such drive mechanism for the shaft 46 includes the chain 72 shown in FIGURES 1, 2 and 5, which is driven by the shaft 73 extending beneath the lower chain 6 and having a sprocket 74 engaged with the lower stretch of such lower chain which is shown in FIGURES 1 and 2. By making the sprockets on shafts 46 and 73 engaging chain 72 of the same size and the sprocket on shaft 46 engaging chain 8 of the same size as sprocket 74 engaging chain 6, the chain 8 will be driven at the same speed as chain 6.

The drive shaft 47 for upper chain 9 shown in FIGURE 3 may be driven through a jack shaft 75 by chain 76. Shaft 75 is driven from lower chain 7 by a chain 77 engaging a sprocket 78 on shaft 75 and a sprocket 79 on shaft 80. This shaft is turned by a sprocket 81 engaging the lower stretch of chain 82 which in turn is driven by sprocket 83 mounted on the end of shaft 39 as shown in FIGURES 3 and 5. The size of sprockets 81 and 83 will be such with respect to the size of sprockets 78 and 79 and the sizes of the sprockets on which chain 76 runs on shafts 75 and 47 that the speed of the chain 9 will be equal to the speed of the chain 7. Thus, because of the drive mechanism interconnecting chains 6 and 8 and chains 7 and 9, the sheets of veneer will be transported positively and linearly without swerving and with their end portions in flattened condition by the engagement of the chains 6 and 7 and the pads of chains 8 and 9 with the veneer sheets.

In processing the opposite ends of each veneer sheet as it passes through the apparatus of the present invention, such opposite ends will first be trimmed by the trim saws 10 and 11 which cut the ends straight and reduce the veneer sheet to a predetermined length as established by the position of the carriage 23 along the tracks 24, 25. The sheet ends next encounter the scarfing mechanism composed of devices 12 and 13 having cup cutter heads which cut a standing bevel on the left end of the sheet S as shown in FIGURE 4 and an under bevel on the right end of the sheet S as seen in that figure. The shape of these cutter heads is shown in detail in FIGURES 8, 9 and 10 and the mounting of such a cutter head and the manner in which it is driven is shown in FIGURES 6 and 7. Each cutter head includes an axially projecting peripheral flange 84 shown enlarged in FIGURES 8, 9 and 10 from which teeth 85 project axially beyond the flange. As shown best in FIGURE 9, these teeth are inclined relative to radial planes of the cutter head passing through them, respectively, so that their peripheral edges are leading in the direction of rotation as shown in FIGURES 8 and 9. The axially projecting edges of these cutter teeth are beveled as shown in FIGURE 10 to provide clearance.

To cut the bevel on the end of a veneer sheet S as shown in FIGURE 6, the axis about which the cutter head rotates is tilted to a position substantially perpendicular to the plane of the desired scarfed beveled end.

The cutting edges or ends of the cutter teeth preferably are short in a radial direction so that a small chip will be cut by each tooth and the cutter can be rotated at high speed. As shown in FIGURES 8, 9 and 10, the end of each tooth between its outer edge and its inner edge includes a shorter radially inner straight cutting edge portion disposed substantially parallel to a plane perpendicular to the axis of rotation of the cutter head, but which may be inclined somewhat forwardly and outwardly, and a longer radially outer straight cutting edge portion, which is inclined forwardly and inwardly. Such two inclined tooth edge portions converge to a point or angle and form an obtuse angle between them. As shown in FIGURES 6 and 7, the flange 84 can be formed as a detachable ring threaded on a rotor 86 so that the cutter ring can be removed to facilitate sharpening of the cutting bits or teeth 85. The rotor is mounted on the end of a shaft 87 supported in combined radial and thrust anti-friction bearings 88 and 89. A pulley 90 is mounted on the end of shaft 87 remote from the rotor 86 and is driven by a belt 91 from a motor 92 as shown in FIGURE 1.

The cutter head is mounted on an arm 93, one end of which is pivotally supported by the pivot pin 94 on the machine frame. By lengthwise adjustment of rod 95 which reacts from another portion of the frame, the angle of tilt of arm 93 can be adjusted to change the relationship between the plane of the cutter head and the plane of the veneer sheet S. Such adjustment in angle may require the cutter head to be raised or lowered in order to obtain the proper width of cut. This elevational adjustment can be effected by moving along a post 96 a slide 97 which carries the cutter head casing 98. The slide can be secured in the desired adjusted position by tightening a bolt 99.

As the angle of the cutter head and its elevation is adjusted, it may be necessary to shift the cutter head along the arm 93 to locate the cutter head in position to cut the scarf over the entire thickness of the veneer sheet S irrespective of the thickness of such sheet, while at the same time avoiding excessive overlap between the cutter head and the sheet. Such adjustment can be effected by sliding the post 96 along the arm and securing it in the desired position by tightening a bolt 100. The entire cutter head mechanism can be removed for servicing by loosening bolt 99 and sliding the slide 97 off the upper end of post 96. To accomplish this operation it may be necessary to loosen bolt 100 somewhat so that the post 96 can be slid along arm 93.

In order to obtain a very smooth cut by the cutter head, it is desirable to hold the veneer end firmly against suitable backing structure by hold-down mechanism including one component located inwardly from the annulus of the cutting teeth and a second component located outwardly of the annulus of the cutting teeth. The first component is a rotative disk 101 carried by a shaft 102 extending in the direction away from the cutter head rotor shaft 87 through the arm 93. This shaft is rotatively mounted in a sleeve 103 so that it can slide axially in such sleeve and is urged toward the arm by a helical spring 104 engaged between the arm and a nut 105 threaded on the end of the shaft. The spring drawing shaft 102 downward will urge the under side of the hold-down disk 101 against the scarfed end of the veneer sheet S, as shown in FIGURE 6, to press it firmly against the backing plate 106.

To hold down the portion of the veneer sheet end being fed into the cutter, an external hold-down ring 107 rotatively mounted by an anti-friction bearing 108 is provided which encircles the cutter head. An axial edge of the ring 107 is pressed against the unscarfed portion of the veneer sheet and consequently the contact edge of this ring must be in a plane parallel to the sheet S. The bearing 108 therefore bears against a plate 109 which is mounted on a frame portion 110 for limited floating movement. It is retained in place by bolts 111 threaded into the base member 110 and fitting loosely in apertures in the plate 109. The plate is pressed toward the veneer sheet by springs 112 encircling the bolts and engaged between the heads of such bolts and the plate.

The cutter head mechanism shown in FIGURES 6 and 7 is the mechanism which cuts the standing bevel along one end of the veneer sheet S. The cutter head mechanism for cutting the under bevel on the opposite end of the veneer sheet is similar in construction as will be evident from the general illustrations of the cutting mechanisms designated 12 and 13 in FIGURE 4. The principal difference is that for the under bevel cutting mechanism 12 the entire cutter head supporting mechanism is inverted and the cutter head and hold-down members will press the veneer sheet end upward against the backing member 106', instead of downward against a backing member 106 as the standing bevel cutting mechanism acts. The details of the cutter head supporting and driving structure are similar in both cases, however, so that such details of the under bevel cutting mechanism are not illustrated in an enlarged view.

In FIGURE 4 the under bevel cutting mechanism 12 is shown mounted on an arm 93' adjustable about a pivot pin 94' by altering the adjustment of rod 95' lengthwise. The arm 93' carries a downwardly projecting post 96' along which a slide 97' can be moved and secured in desired adjusted positions by tightening bolt 99'. The drive shaft 87' for the cutter head rotor is driven by the belt 91'. The outer hold-down ring 107' presses the end of the veneer sheet upward against the backing plate 106'. The angle of arm 93', the location of post 96' and the elevation of slide 97' can be adjusted to position the cutter head in the same manner as the corresponding components of the cutter head 13 are adjusted as described above.

The cutter heads described can be set to provide proper clearance. Thus, for cutter 84, FIGURE 6, after loosening bolt 100 securing post 97 to its base 93, a shim can be inserted beneath the side of the post end which will tilt the post 97, cutter head shaft 87 and cutter 84 to give clearance for the return of the teeth on the trailing side of the cutter across the scarfed surface. In this manner the cutter head is tilted with respect to the travel of the sheet to give "heel relief" as well as being tilted at the angle to the plane of the sheet necessary to cut the scarf.

Because the end of each tooth is formed by edge portions inclined oppositely from the opposite side edges of the tooth at an obtuse angle, as shown in FIGURE 8, to a point or apex between such side edges, the teeth do not cut straight into the wood but initially form an angle groove. Moreover, the direction of cut is from a location spaced from the end of such veneer sheet toward the sheet end. Following initiation of the cut the starting location progresses farther from the sheet end until the cutter is cutting the full width of the scarf. Because of the slope of the scarf, the cut becomes progressively deeper toward the sheet end.

This action of cutting from the face of the veneer sheet toward its end has several advantages. The cutting pressure of the radially outer inclined edge portions of each tooth being partially downward as the cutter digs deeper into the wood during its progress helps to press the veneer sheet end against the backing plate 106 in opposition to any warping tendency. By cutting from the face of the veneer sheet toward its end, much less damage by breaking or splitting occurs at the sheet end because the cutter teeth run out at the end of the sheet instead of entering at the sheet end. Such cutter action causes minimum damage to low grade veneers having more knots, knotholes, cross grain, brashy grain and pitch pockets.

Following completion of the end-beveling operation adhesive will be applied to the beveled ends by the adhesive-applying mechanism described above. As shown in FIGURE 11, the upper glue-applying roll 18 is carried by shaft 113, which is rotated by a belt 114 interconnecting pulleys on shaft 113 and shaft 75 in FIGURE 1 so that the periphery of roll 118 will travel at approximately the same speed as the veneer sheet and the roll's zone of contact will move in the same direction as the veneer sheet. The periphery of this roll is grooved or knurled to hold and apply an accurately metered quantity of glue. Shaft 115 supporting doctor roll 17 may be rotated by a gear drive 116 from shaft 113. The gears will be of proper sizes to drive the periphery of doctor roll 17 at a speed substantially slower than the periphery of roll 18, such as one-fourth to one-eighth of the speed of the periphery of roll 18. The difference in speed of the roll peripheries and grooving of the glue roll makes the metered amount of glue passing between the rolls adhere to the glue roll and not to the doctor roll. The proper selected metering distance between the rolls is held by an adjusting screw. The two rolls are urged toward each other by spring pressure so that a chip or other small obstruction can pass between the rolls, forcing them apart momentarily, and the spring pressure will immediately return them to the set spacing.

For applying adhesive to the under bevel along the opposite end of the veneer sheet S, the glue-applying roll 21 is supported by shaft 117 while the glue-applying roll 19 is supported by shaft 118. These shafts are interconnected by gears 119 shown in FIGURE 1 which are of sizes such that the periphery of the larger roll 19 will move at a speed much less than that of the glue-applying roll 21. The gears 119 are driven by a gear 120 meshing with the gear on shaft 118. Gear 120 is mounted on shaft 121 which is connected by a universal joint to shaft 122. This shaft is driven by chain sprocket 123 engaging the upper side of the lower stretch of chain 6. In this manner the rolls 19 and 21 may be driven so that the peripheral speed of roll 19 is one-quarter to one-eighth of the speed of roll 21 and the glue will thus be stripped from roll 19 by roll 21 to be applied to the scarfed surface of the sheet end.

As has been explained previously, shaft 75 which drives the adhesive-applying rolls 17 and 18 for the standing bevel is driven through chains 77 and 82 from shaft 39 carrying the sprocket 41 for chain 7 so that these adhesive-applying rolls will be turned in approximate synchronism with the speed of movement of the chain 7. Similarly, because the rolls 19 and 21 are driven from chain 6 by the mechanism described, this adhesive-applying mechanism will be driven in approximate synchronism with chain 6. The adhesive will, therefore, be rolled onto the scarfed ends of the veneer sheet with little relative sliding movement between either scarfed surface and the roll applying adhesive to it.

As has been mentioned previously, as the chains 6, 7, 8 and 9 move a veneer sheet from the adhesive-applying mechanism toward the ends of the chain loops, the bars 22 spaced a substantial distance beneath the sheet S, as shown in FIGURE 3, will be moved lengthwise to the right as seen in that figure, at the same speed as the transport chains and veneer sheet are moving. These bars are driven in this fashion by pinions 125 engaging racks 124 on the bottoms of these bars. Such pinions are mounted on shaft 126. The racks of bars 22 are held in engagement with the pinions 125 by backing rollers 127 shown in FIGURE 5.

The bars 22 are moved slowly to the right in synchronism with the feed of the veeneer sheet by the chains 6, 7, 8 and 9 until a sheet of veneer has been deposited on such bars and are then retracted quickly to the left, as seen in FIGURES 1 and 3. In order to provide such reversal of movement, shaft 126 will be rotated first in one direction and then in the opposite direction. The rotation in the direction to drive the bars 22 to the right will be at a rate much slower than the rate of rotation of shaft 126 in the opposite direction to retract such bars.

Reversible rotation of shaft 126 at different speeds is effected by alternately engageable clutch elements. The clutch element 128 is driven by a sprocket 129 engaging chain 82, as shown in FIGURE 3. This clutch element is arranged concentrically with shaft 126 and the size of sprocket 129 is such, with reference to the gears 125 and the speed of chain 82, that shaft 126 will be rotated at the proper speed in the clockwise direction, as seen in FIGURE 3, to coordinate movement of the bars 22 to the right in synchronism with the movement of the veneer sheet S.

After the bars 22 have been moved to the right a distance equal to the width of a veneer sheet so that it has been discharged from engagement by the chains 6, 7, 8 and 9 and moved into a position over a stack of veneer sheets being accumulated, the clutch 128 will be disengaged and the alternate clutch 130 will be engaged immediately. Clutch 130 is mounted concentrically with an inner shaft 131 on which sprocket 132 engaged with chain 82 is mounted.

A sleeve 133 loose on such shaft carries gear 134 meshing with a gear 125 on shaft 126 as shown in FIGURE 5. This sleeve, as well as shaft 131, extends into the clutch 130 so that when it is energized sleeve 133 will be turned with shaft 131 to rotate shaft 126 counterclockwise, as seen in FIGURE 3. It will be noted that sprocket 132 is smaller than sprocket 129, as seen in FIGURE 3, and that gear 134 is considerably larger than gear 125 so that such counterclockwise rotation of shaft 126 will be rapid to withdraw bars 22 quickly to the left from beneath the veneer sheet on them. As retraction of the bars 22 is completed, clutch 130 will be deenergized and clutch 128 will be energized again to initiate movement of bars 22 to the right in synchronism with the next veneer sheet S being discharged from the chains 6, 7, 8 and 9.

It will therefore be evident that after proper adjustments of the apparatus have been made for the length of veneer sheet being processed it will only be necessary to feed veneer sheets one at a time, either manually or from a suitable hopper, onto the feed chains 4 and 5. Because the upper chains 8 and 9 are pressed downward by springs, no adjustment need be made for different thicknesses of veneer processed. The slope of the scarf can be maintained the same for all thicknesses, the scarfed bevel surface being wider on thicker veneers. The veneer sheets will then be fed automatically through the apparatus and will be trimmed to the length for which the carriage has been set, the opposite ends will be scarfed, adhesive will be applied to the scarfed surfaces and the sheets will be stacked at the discharge side of the apparatus, all without further attention by the operator.

I claim as my invention:

1. In a sheet end scarfing machine, a scarfing cutter including a cup cutter head, means supporting said cutter head for rotation about an axis extending transversely of the sheet on which it cuts a bevelled surface and also extending substantially perpendicular to such bevelled surface, said cutter head having an annular row of blades projecting axially therefrom, a rotatable work hold-down disk received within said annular row of blades and having a work-engaging surface disposed substantially coplanar with the cutting ends of the annular row of blades, and means at the side of said cutter head opposite said cutter head supporting means supporting said hold-down disk for rotation about an axis substantially parallel to the axis of rotation of said cutter head.

2. In a sheet end scarfing machine as set forth in claim 1 in which said means at the side of said cutter head opposite said cutter head supporting means are independent of said cutter head and said cutter head supporting means.

References Cited in the file of this patent
UNITED STATES PATENTS
379,602    Philbrick _____ Mar. 20, 1888
(Other references on following page)

UNITED STATES PATENTS

| | | | |
|---|---|---|---|
| 720,628 | Shaw | Feb. 17, 1903 |
| 1,325,185 | Bailey et al. | Dec. 16, 1918 |
| 1,473,733 | Norris | Nov. 13, 1923 |
| 1,490,594 | De Lateur | Apr. 15, 1924 |
| 1,771,105 | Williams | July 22, 1930 |
| 2,186,417 | Kraus | Jan. 9, 1940 |
| 2,242,179 | Gustin | May 13, 1941 |
| 2,555,382 | Uschmann et al. | July 5, 1951 |
| 2,571,603 | Payzant | Oct. 16, 1951 |
| 2,595,879 | Pasquier | May 6, 1952 |
| 2,616,501 | Smith | Nov. 4, 1952 |
| 2,705,981 | Smith | Apr. 12, 1955 |
| 2,785,714 | Simmons et al. | Mar. 19, 1957 |
| 2,823,712 | Ranta | Feb. 18, 1958 |
| 2,851,070 | Hughes | Sept. 9, 1958 |
| 2,918,951 | Haumann | Dec. 29, 1959 |
| 2,922,448 | Standal | Jan. 26, 1960 |
| 2,963,059 | Grub | Dec. 6, 1960 |